(12) United States Patent
Andrade Soares et al.

(10) Patent No.: US 10,634,361 B2
(45) Date of Patent: Apr. 28, 2020

(54) GAS-HEATED COOKING DEVICE

(71) Applicant: BSH Bosch und Siemens Hausgerate GmbH, Munich (DE)

(72) Inventors: Paulo Marcos Andrade Soares, Santander (ES); Melca Gutierrez Humara, La Penilla (ES); Oscar Peña Martin, Boo de Pielagos (ES); Emilio Placer Maruri, Liencres (ES)

(73) Assignee: BSH Hausgeräte GmbH, Munich (DE)

( * ) Notice: Subject to any disclaimer, the term of this patent is extended or adjusted under 35 U.S.C. 154(b) by 616 days.

(21) Appl. No.: 14/402,695

(22) PCT Filed: May 15, 2013

(86) PCT No.: PCT/IB2013/053951
§ 371 (c)(1),
(2) Date: Nov. 21, 2014

(87) PCT Pub. No.: WO2013/175350
PCT Pub. Date: Nov. 28, 2013

(65) Prior Publication Data
US 2015/0153046 A1 Jun. 4, 2015

(30) Foreign Application Priority Data
May 22, 2012 (ES) .................................. 201230761

(51) Int. Cl.
*F24C 3/12* (2006.01)
*F24C 3/00* (2006.01)
*B23P 19/04* (2006.01)

(52) U.S. Cl.
CPC .............. *F24C 3/126* (2013.01); *B23P 19/04* (2013.01); *F24C 3/008* (2013.01); *Y10T 29/49895* (2015.01)

(58) Field of Classification Search
CPC ........... B23P 19/04; F24C 3/008; F24C 3/126
See application file for complete search history.

(56) References Cited

U.S. PATENT DOCUMENTS

| | | | | |
|---|---|---|---|---|
| 3,848,839 A | * | 11/1974 | Tillman | F16L 3/04 248/62 |
| 4,252,289 A | * | 2/1981 | Herb | F16L 3/11 248/62 |
| 4,371,764 A | * | 2/1983 | Runion | H01H 3/0206 200/61.86 |

(Continued)

FOREIGN PATENT DOCUMENTS

| | | | | |
|---|---|---|---|---|
| FR | | 2177598 A1 | 11/1973 | |
| WO | WO 0173326 A1 | * | 10/2001 | ........... F16K 5/0214 |

OTHER PUBLICATIONS

International Search Report PCT/IB2013/053951 dated Dec. 12, 2013.
Report of Examination CN 201380026681.2 dated Dec. 3, 2015.

*Primary Examiner* — Avinash A Savani
*Assistant Examiner* — Deepak A Deean
(74) *Attorney, Agent, or Firm* — Michael E. Tschupp; Andre Pallapies; Brandon G. Braun

(57) ABSTRACT

A gas-heated cooking appliance, e.g. a gas cooktop, includes at least one gas valve, which has a connector, and a gas line, which is connected to the connector to supply the gas valve with gas. A carrier part is fastened to a housing part and fixes the gas line relative to the connector.

24 Claims, 5 Drawing Sheets

(56) References Cited

U.S. PATENT DOCUMENTS

| | | | | |
|---|---|---|---|---|
| 5,094,259 | A * | 3/1992 | Hsu | F23N 5/123 |
| | | | | 137/614.11 |
| 6,050,808 | A * | 4/2000 | Schloss | F23N 5/102 |
| | | | | 126/39 E |
| 7,178,203 | B2 | 2/2007 | Pearson et al. | |
| 7,299,799 | B2 * | 11/2007 | Albizuri | F24C 3/12 |
| | | | | 126/39 BA |
| 7,425,128 | B2 * | 9/2008 | Gjerde | F24C 3/126 |
| | | | | 335/162 |
| 7,513,247 | B2 * | 4/2009 | Clauss | F23N 1/005 |
| | | | | 126/39 E |
| 7,811,082 | B2 * | 10/2010 | Czajka | F24C 3/103 |
| | | | | 126/39 G |
| 8,033,279 | B2 * | 10/2011 | Shaffer | F24C 3/126 |
| | | | | 126/1 R |
| 9,476,594 | B2 * | 10/2016 | Fockler | F24C 3/124 |
| 9,488,283 | B2 * | 11/2016 | Cadima | F16K 5/0407 |
| 9,593,855 | B2 * | 3/2017 | Moro | F23N 5/107 |
| 2005/0257784 | A1 * | 11/2005 | Albizuri | F24C 3/12 |
| | | | | 126/39 N |
| 2007/0044786 | A1 * | 3/2007 | Frost | F24C 3/126 |
| | | | | 126/39 N |
| 2010/0126495 | A1 * | 5/2010 | Shaffer | F24C 3/126 |
| | | | | 126/39 E |
| 2011/0126816 | A1 * | 6/2011 | Salbide Mutiloa | F23N 5/245 |
| | | | | 126/42 |
| 2012/0247443 | A1 * | 10/2012 | Atalay | F24C 3/12 |
| | | | | 126/42 |
| 2013/0000630 | A1 * | 1/2013 | Catalogne | F24C 3/00 |
| | | | | 126/39 E |
| 2014/0165849 | A1 * | 6/2014 | Mateos Martin | A47J 36/32 |
| | | | | 99/342 |

* cited by examiner

GAS-HEATED COOKING DEVICE

BACKGROUND OF THE INVENTION

The present invention relates to a gas-heated cooking appliance.

Gas-heated cooking appliances generally have a multiplicity of gas valves. The gas valves are in each case provided with a connector, in order to connect a respective gas valve to a gas line.

BRIEF SUMMARY OF THE INVENTION

The object of the present invention is to provide an improved gas-heated cooking appliance which is preferably characterized by a simple structure.

To solve this problem, a gas-heated cooking appliance with at least one gas valve, a gas line, a housing part and a carrier part is proposed. The at least one gas valve has a connector. The gas line is connected to the connector, in order to supply the gas valve with gas. The carrier part is attached to the housing part. The carrier part further fixes the gas line relative to the connector.

In that the carrier part on the one hand is attached to the housing part and the carrier part and on the other fixes the gas line relative to the connector, a simple structure emerges. The gas-heated cooking appliance preferably has a multiplicity of gas valves. Each of the multiplicity of gas valves comprises a connector. Each of the connectors is connected to the gas line. The carrier part preferably fixes the gas line relative to the multiplicity of connectors. Assembly of the gas-heated cooking appliance is thereby simplified. The fixing of the gas line by means of the carrier part can merely represent preassembly, which simplifies assembly of the gas-heated cooking appliance overall. Within the framework of the main assembly, means can additionally be provided which connect the gas line direct to the gas valve itself.

A gas-conducting connection between the gas line and the connector can for example be manufactured in that the connector has a hollow rod, which pierces the gas line in a radial manner.

According to one embodiment at least one pipe bracket is provided for fixing purposes, which is divided and capable of being closed at its periphery, in order to accommodate the gas line. This allows the gas line to be inserted radially to its longitudinal direction into the pipe bracket, which enables simple assembly, for example from above the carrier part.

According to a further embodiment ends of the pipe bracket can be brought into engagement with each other in an elastic manner, for closure of the same. This further simplifies assembly. To this end the pipe bracket (or at least its ends) can be manufactured from an elastic material, in particular plastic.

According to a further embodiment a multiplicity of gas valves are provided with a respective connector, which are arranged next to each other in the longitudinal direction of the gas line. The carrier part preferably fixes the gas line relative to a respective connector. A simple structure is thereby provided.

According to a further embodiment a multiplicity of pipe brackets are provided, which are arranged distributed in the longitudinal direction of the gas line between the gas valves. The gas line can also thereby be precisely positioned over longer stretches.

According to a further embodiment the carrier part is at least partially manufactured from plastic. It is thereby simple to manufacture.

According to a further embodiment the carrier part has a seat for the gas valve. The carrier part thus fixes not only the gas line, but also one or a multiplicity of gas valves.

According to a further embodiment the seat is embodied in the form of a circle segment. The seat preferably spans an angle of more than 180°. A radial fixing of the gas valve in the seat is thereby effected.

According to a further embodiment the carrier part has centering means for centering of the gas valve relative to the housing part or to a further housing part. The seat at the same time preferably serves as a centering means.

According to a further embodiment the carrier part has retaining means for a board. The board carries electronic components, for example lighting means, in particular LEDs, resistors, a display device, an input device and/or a microprocessor.

According to a further embodiment the housing part is a lower housing part. Additionally or alternatively the further housing part can embody an upper housing part. Openings are preferably formed in the upper housing part through which the actuating shafts of the gas valves can be passed.

According to a further embodiment the housing part or the further housing part is manufactured from sheet metal. This is cost-effective.

The housing part and the further housing part can be connected to each other, in order to form a closed housing.

According to a further embodiment the cooking appliance is embodied as a cooktop.

A method for assembling a gas-heated cooking appliance, in particular the inventive cooking appliance, is further proposed. In the method, a carrier part is attached to a housing part. A gas line is further fixed relative to a connector of a gas valve by means of the carrier part.

According to one embodiment, the carrier part centers the gas valve relative to the housing part or a further housing part.

Further possible implementations of the invention also comprise not explicitly specified combinations of features or embodiments of the cooking appliance or of the method previously or subsequently described with reference to the exemplary embodiments. Here, the person skilled in the art will add or amend individual aspects as improvements or augmentations to the respective basic form of the invention.

Further advantageous embodiments and aspects of the invention are the subject of the subsidiary claims and the exemplary embodiments of the invention subsequently described. The invention is further explained in greater detail on the basis of preferable embodiments, with reference to the attached figures.

DETAILED DESCRIPTION OF EXEMPLARY EMBODIMENTS OF THE PRESENT INVENTION

Figure 1A:
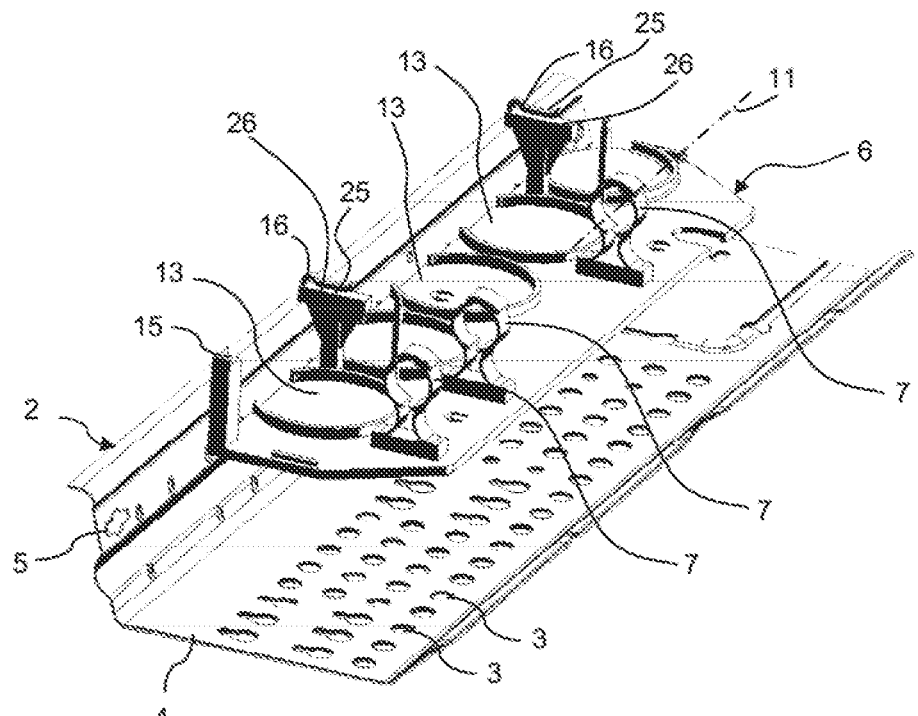
FIG. 1A: shows in an exploded view in three-dimensional form a first state during assembly of a cooking appliance according to one embodiment.

In the figures the same reference characters identify the same or functionally identical elements, unless otherwise specified.

Figure 1B:
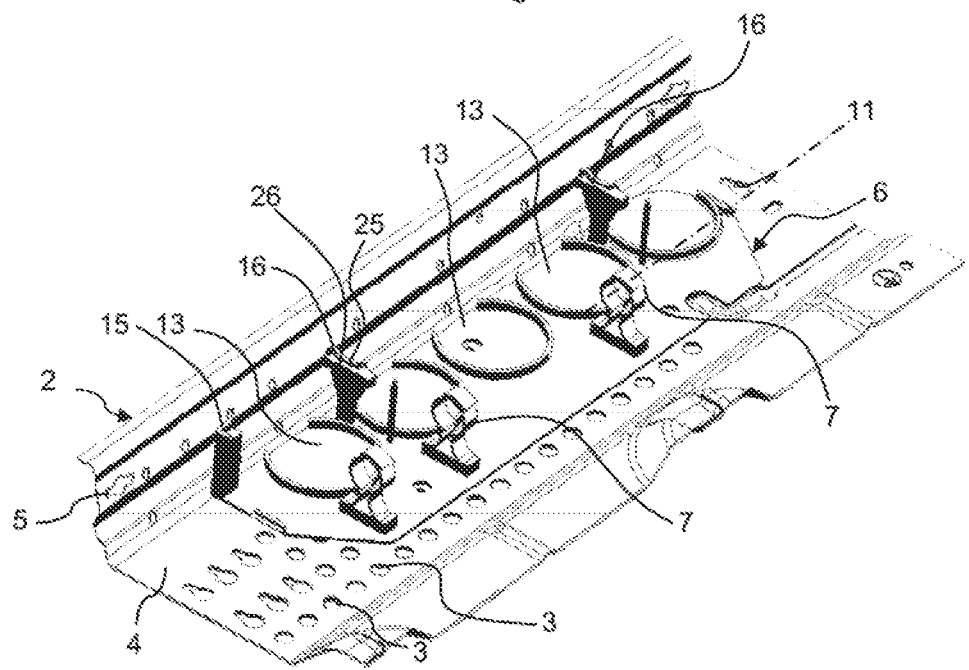
FIG. 1B: shows in a three-dimensional view components from FIG. 1A in the assembled state.
Figure 5A:
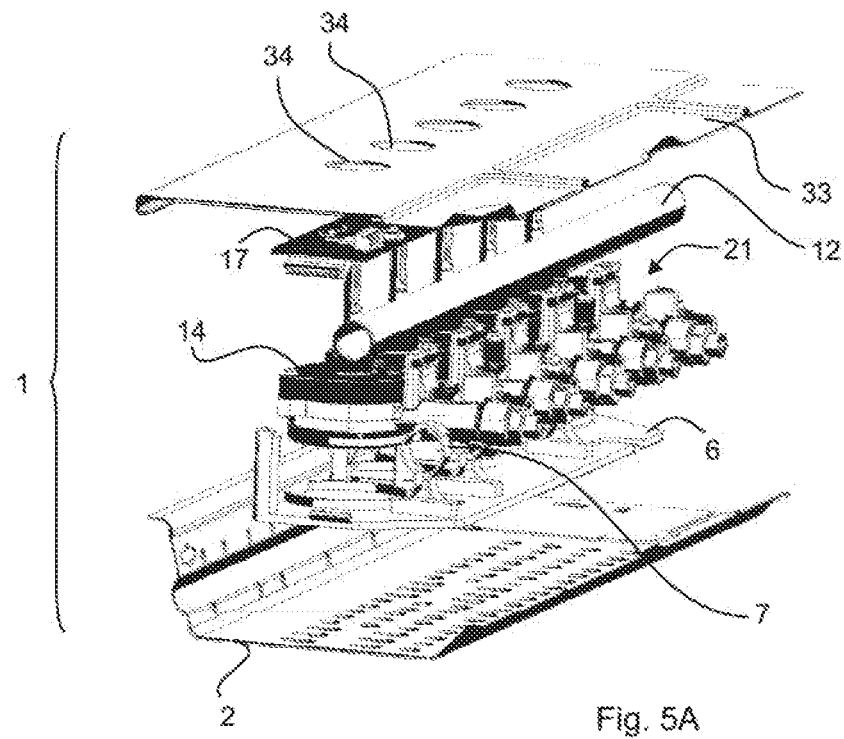
FIG. 5A: shows in an exploded view in three-dimensional form a fifth state during assembly of the cooking appliance.
Figure 5B:
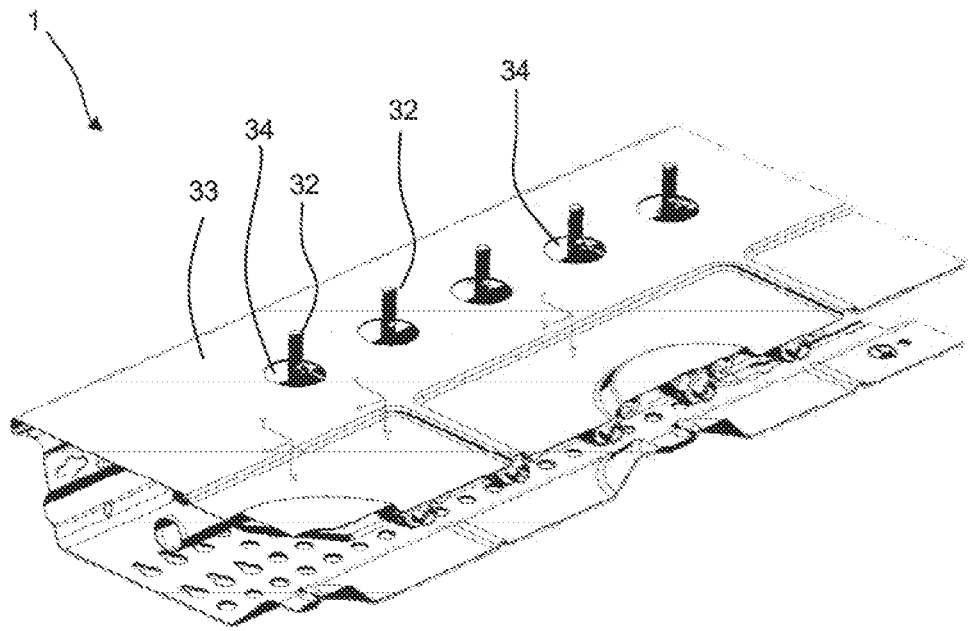
FIG. 5B: shows in a three-dimensional view components from FIG. 5A in the assembled state.

FIG. 1A shows in an exploded view in three-dimensional form a first state during assembly of a cooking appliance 1 (see FIGS. 5A and 5B). FIG. 1B shows in a three-dimensional view components from FIG. 1A in the assembled state.

The cooking appliance 1 can for example be embodied as a cooktop. This can be seen in FIG. 5B.

The cooking appliance 1 comprises a first housing part in the form of a base plate 2. The base plate 2 can have holes 3 for the feeding of primary air. The base plate 2 can further have a horizontal section 4 and a vertical section 5.

The cooking appliance 1 further comprises a carrier part 6, which is embodied for example in plastic. The carrier part 6 comprises a multiplicity of pipe brackets 7. The pipe brackets 7 are arranged in the longitudinal direction 11 of a gas line 12 shown for example in FIG. 3B. The carrier part 6 further comprises a multiplicity of seats 13. A respective seat 13 is embodied in the form of a circle segment-shaped recess, which encloses an angle for example greater than 180°, in particular 200-300°. Gas valves 14, such as are for example shown in FIG. 2B, can in each case be accommodated in the seats 13. The carrier part 6 still further has retaining elements 15, 16 to hold a board 17 shown for example in FIG. 4A.

In a first step the carrier part 6 is now connected to the base plate 2. To this end the carrier part 6 can be connected either to the horizontal or the vertical section 4, 5 or to both. Screws and/or adhesive can be used for the connection. FIG. 1B shows the connected state of the base plate 2 with the carrier part 6.

Figure 2A:
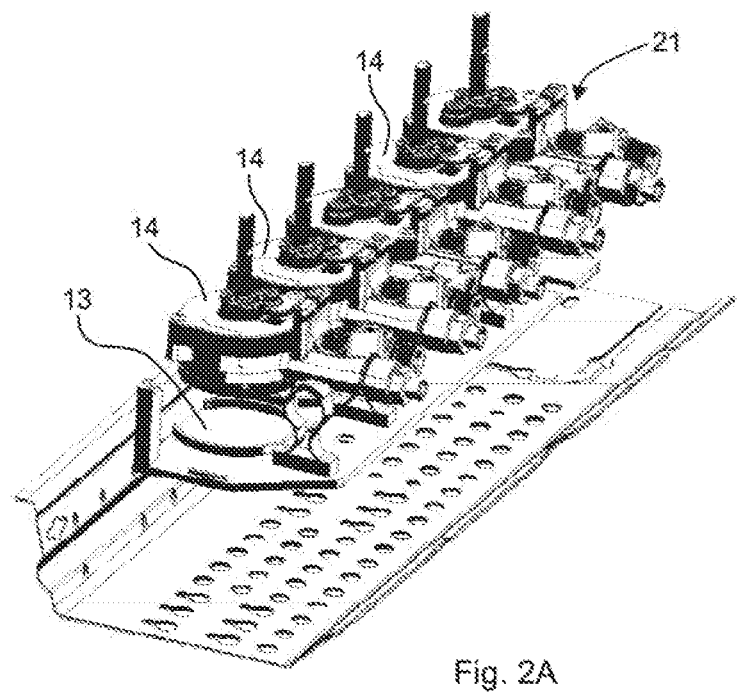
FIG. 2A: shows in an exploded view in three-dimensional form a second state during assembly of the cooking appliance.
Figure 2B:
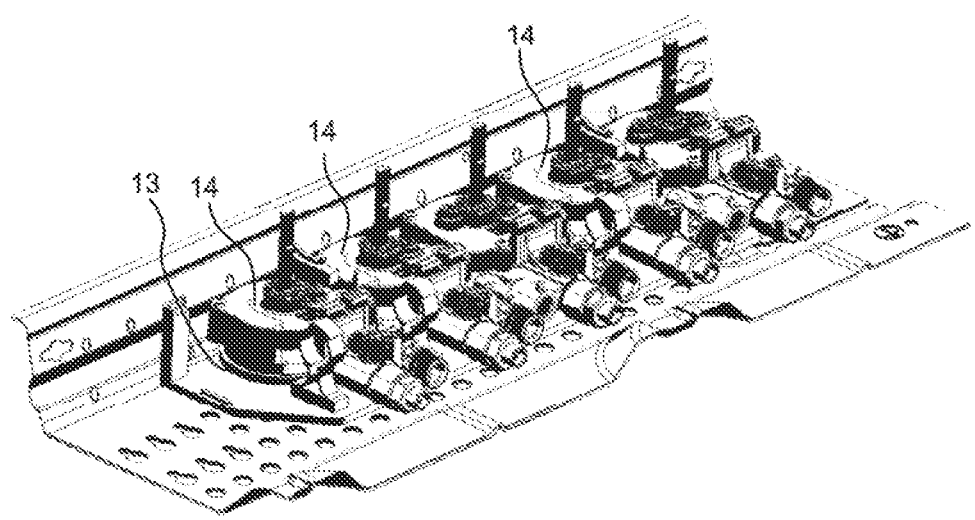
FIG. 2B: shows in a three-dimensional view components from FIG. 2A in the assembled state.

FIG. 2A shows in an exploded view in three-dimensional form a second state during assembly of the cooking appliance 1. FIG. 2B shows in three-dimensional form components from FIG. 2A in the assembled state.

Subsequent to the state shown in FIGS. 1A and 1B, the gas valves 14 are now in each case located in the seats 13. A respective gas valve 14 is thereby fixedly radially connected to the carrier part 6. The corresponding state is shown in FIG. 2B.

Figure 3A:
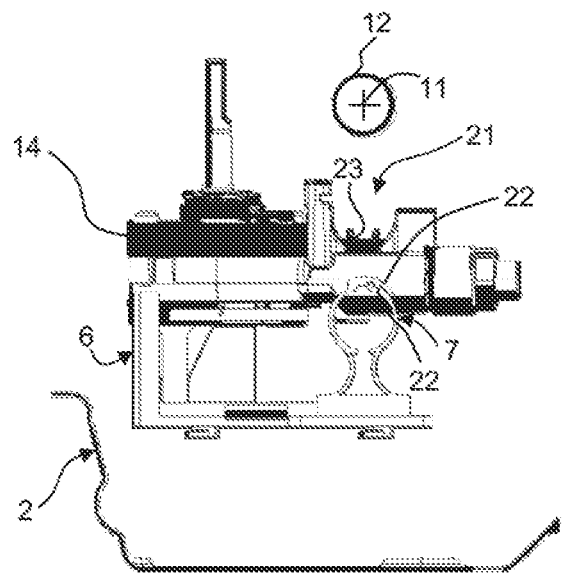
FIG. 3A: shows in an exploded view, seen in sectional form, a third state during assembly of the cooking appliance.
Figure 3B:
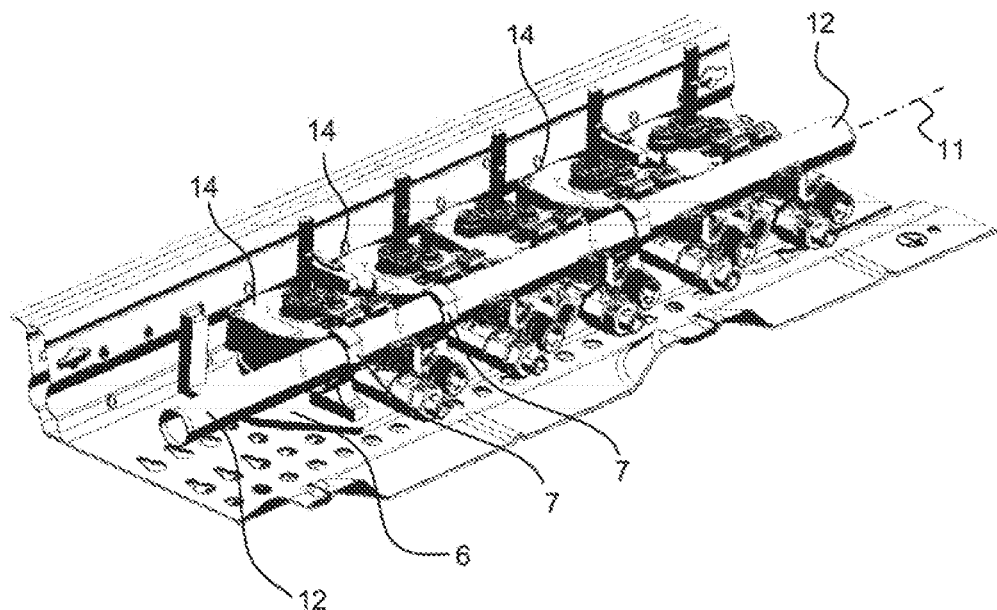
FIG. 3B: shows components from FIG. 3A in the assembled state.

FIG. 3A shows in an exploded sectional view a third state during assembly of the cooking appliance 1. FIG. 3B shows in a three-dimensional view components from FIG. 3A in the assembled state.

A respective gas valve 14 comprises a connector 21. The gas line 12 is connected to a respective connector 21 in such a way that it is pressed onto the connectors 21. Previously, however, the pipe brackets 7 are opened at their respective periphery, for which purpose ends 22 (see FIG. 3A) of a respective pipe bracket 7 are brought out of engagement with each other. The gas line 12 is then introduced into a respective pipe bracket 7, in a radial manner relative to the longitudinal direction 11 of the gas line 12, upon which the ends 22 are again brought into engagement with each other in an elastic manner. A gas-conducting connection between the gas line 12 and a respective connector 21 can be provided in such a way that the connector 21 comprises a hollow, gas-conducting rod 23, which penetrates the gas line 12 in a radial manner, when this is pressed onto the rod 23. The pipe brackets 7 then hold the gas line 12 in the gas-conducting state, connected to the connectors 21. This state is shown in FIG. 3B.

Figure 4A:
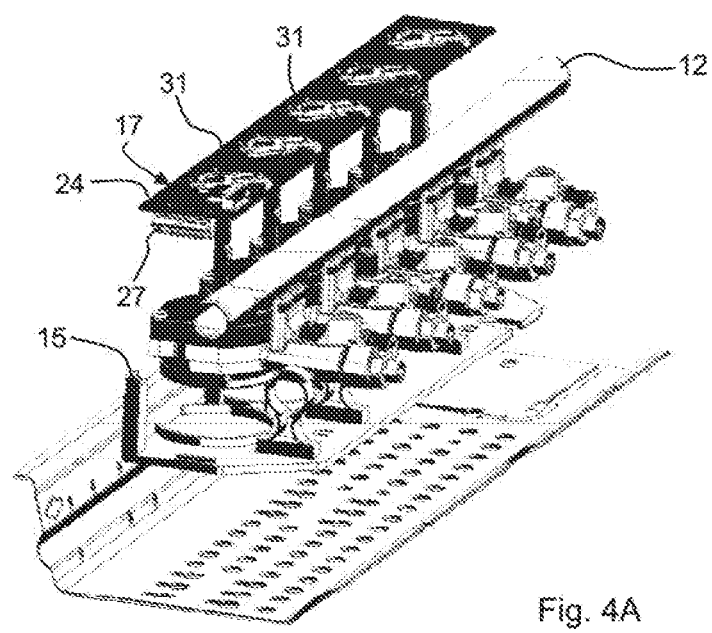
FIG. 4A: shows in an exploded view in three-dimensional form a fourth state during assembly of the cooking appliance.
Figure 4B:
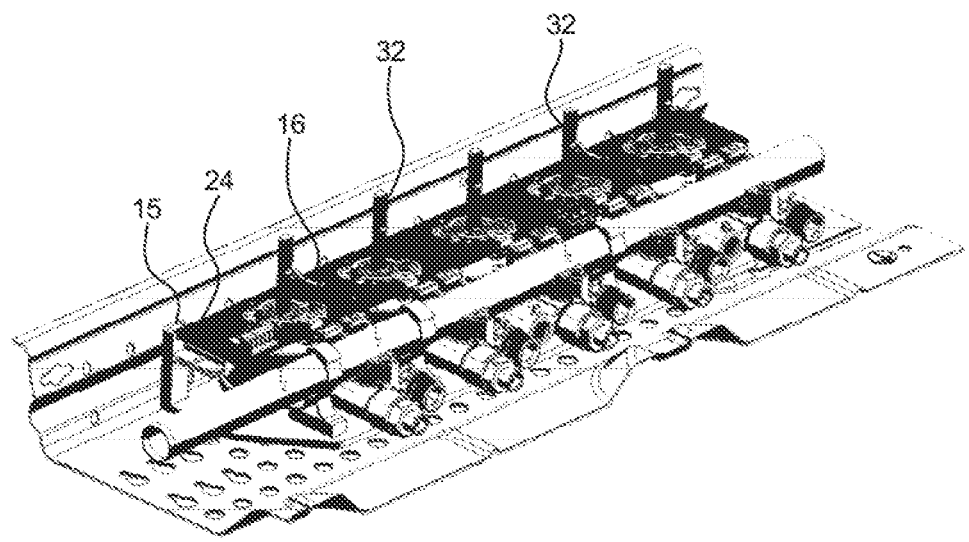
FIG. 4B: shows in a three-dimensional view components from FIG. 4A in the assembled state.

FIG. 4A shows in an exploded view in three-dimensional form a fourth state during assembly of the cooking appliance 1. FIG. 4B shows in three-dimensional form components from FIG. 4A in the assembled state.

Subsequently to the state shown in the FIGS. 3A and 3B, the board 17 is mounted on the carrier part 6 by means of the retaining elements 15, 16. The retaining elements 15 can here be created in such a way that they in each case enclose a corner 24 of the board 17. The retaining elements 16 can on the other hand have clamps, which may be seen in FIG. 1A, which press the board 17 against a stop 26 in a frictionally engaged manner. The corresponding state is shown in FIG. 4B.

The board 17 has various electronic components, for example a plug 27 and for example a microprocessor (not shown). In addition the board 17 has openings 31. An actuating shaft 32 (see FIG. 4B) of a respective gas valve 14 extends through a respective opening 31 in the assembled state, in order to regulate a gas flow to burners (not shown) of the cooking appliance 1.

FIG. 5A shows in an exploded view in three-dimensional form a fifth state during assembly of the cooking appliance 1. FIG. 5B shows in a three-dimensional view the components from FIG. 5A in the assembled state.

Subsequent to the state shown in FIGS. 4A and 4B, a second housing part in the form of a cover plate 33 is now positioned on the base plate 2 and fixedly connected thereto. The cover plate 33 likewise has openings 34 for through-engagement of the actuating shafts 32 in the assembled state. This state is shown in FIG. 5B. The seats 13 of the carrier part 6 function as centering means and center the gas valves 14, in particular their actuating shafts 32, relative to the openings 34 in the cover plate 33.

Although the present invention has been described on the basis of preferable exemplary embodiments, it may be modified in many different ways.

The invention claimed is:

1. A gas-heated cooking appliance, comprising:
at least one gas valve having a connector;
a gas line connected to the connector to supply the at least one gas valve with gas;
a first housing part; and
a carrier part attached to the first housing part and configured to fix the gas line relative to the connector, the carrier part including:
at least one dividable pipe bracket to accommodate the gas line, the pipe bracket having ends that can be engaged to close the pipe bracket, and
a seat configured to receive the gas valve, wherein the gas valve partially rests in the seat, wherein the seat is embodied in the form of an upwardly facing circle segment.

2. The cooking appliance of claim 1, wherein the ends of the at least one pipe bracket can be brought into engagement with each other in an elastic manner for closing the at least one pipe bracket.

3. The cooking appliance of claim 1, further comprising a multiplicity of said gas valve arranged next to each other in a longitudinal direction of the gas line, said carrier part fixing the gas line relative to the connector of each of the gasvalves.

4. The cooking appliance of claim 3, wherein the carrier part includes a multiplicity of pipe brackets arranged in spaced-apart relationship between the gasvalves in the longitudinal direction of the gas line.

5. The cooking appliance of claim 1, wherein the carrier part is manufactured at least partially from plastic.

6. The cooking appliance of claim 1, further comprising a second housing part, said carrier part having a centering member configured to center the gas valve relative to the second housing part.

7. The cooking appliance of claim 1, further comprising a board, said carrier part having retainers configured to hold the board.

8. The cooking appliance of claim 6, wherein the first housing part is a lower housing part comprising a base plate and the second housing part is an upper housing part.

9. The cooking appliance of claim 6, wherein at least one of the first and second housing parts is manufactured from sheet metal.

10. The cooking appliance of claim 1, constructed in the form of a gas cooktop.

11. The gas-heated cooking appliance of claim 1, wherein the seat is formed on an upwardly facing support surface of the carrier part, and the at least one gas valve rests in and is supported by the seat of the carrier part, the seat of the carrier part fixing a position of the at least one gas valve relative to the first housing part.

12. The gas-heated cooking appliance of claim 11, further comprising: a second housing part having at least one opening accommodating an actuating shaft of the at least one gas valve, wherein the seat of the carrier part fixes the position of the at least one gas valve relative to the first housing part and the second housing part such that the actuating shaft of the at least one gas valve is centered relative to the at least one opening of the second housing part.

13. The gas-heated cooking appliance of claim 1, wherein the seat is a circle segment-shaped recess formed on an upwardly facing support surface of the carrier part, and the at least one gas valve rests in and is supported by the circle segment-shaped recess of the carrier part, the circle segment-shaped recess of the carrier part radially fixing the position of the at least one gas valve relative to the first housing part.

14. The gas-heated cooking appliance of claim 13, further comprising: a second housing part having at least one opening accommodating an actuating shaft of the at least one gas valve, wherein the circle segment-shaped recess of the carrier part radially fixes the position of the at least one gas valve relative to the first housing part and the second housing part such that the actuating shaft of the at least one gas valve is centered relative to the at least one opening of the second housing part.

15. A method for assembling a gas-heated cooking appliance, comprising:

attaching a carrier part to a first housing part, wherein the first housing part comprises a base plate, the carrier part having an upwardly facing seat for receiving a gas valve and at least one pipe bracket, wherein the gas valve partially rests in the upwardly facing seat;

dividing a periphery of the at least one pipe bracket of the carrier part to accommodate a gas line;

fixing the gas line relative to a connector of the gas valve through intervention of the carrier part; and closing the periphery of the at least one pipe bracket by engaging ends of the at least one pipe bracket with each other wherein the upwardly facing seat is embodied in the form of an upwardly facing circle segment.

16. The method of claim 15, further comprising centering the gas valve relative to a second housing part via the carrier part.

17. The method of claim 15, further comprising fixing the gas line relative to connectors of a multiplicity of gas valves arranged next to each other in a longitudinal direction of the gas line.

18. The method of claim 17, further comprising arranging a multiplicity of pipe brackets of the carrier part in spaced-apart relationship between the gas valves in the longitudinal direction of the gas line.

19. The method of claim 15, further comprising manufacturing the carrier part at least partially from plastic.

20. The method of claim 15, further comprising centering the gas valve relative to a second housing part of the cooking appliance.

21. The method of claim 15, further comprising holding a board by retainers of the carrier part.

22. The method of claim 20, wherein the first housing part is a lower housing part comprising a base plate and the second housing part is an upper housing part.

23. The method of claim 20, further comprising manufacturing at least one of the first and second housing parts from sheet metal.

24. A gas-heated cooking appliance, comprising:
at least one gas valve having a connector;
a gas line connected to the connector to supply the at least one gas valve with gas;
a first housing part, wherein the first housing part comprises a base plate; and
a carrier part attached to the first housing part and configured to fix a position of the gas line and the at least one gas valve relative to the first housing part, the carrier part including:
an upwardly facing seat formed on the carrier part, the at least one gas valve at least partially resting in and being supported by the upwardly facing seat of the carrier part, the upwardly facing seat of the carrier part fixing a position of the at least one gas valve relative to the first housing part; and
at least one dividable pipe bracket to accommodate the gas line, the at least one dividable pipe bracket having ends that can be engaged to close the at least one dividable pipe bracket around the gas line and fix a position of the gas line relative to the connector of the at least one gas valve
wherein the upwardly facing seat is embodied in the form of an upwardly facing circle segment.

* * * * *